United States Patent
MacCarthaigh et al.

(10) Patent No.: US 8,452,874 B2
(45) Date of Patent: May 28, 2013

(54) REQUEST ROUTING PROCESSING

(75) Inventors: Colm MacCarthaigh, Seattle, WA (US);
David R. Richardson, Seattle, WA (US);
Benjamin W. S. Redman, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 379 days.

(21) Appl. No.: 12/952,118

(22) Filed: Nov. 22, 2010

(65) Prior Publication Data

US 2012/0131192 A1    May 24, 2012

(51) Int. Cl.
*G06F 15/16* (2006.01)

(52) U.S. Cl.
USPC .......................... 709/226; 709/222

(58) Field of Classification Search
USPC .................................. 709/226, 222
See application file for complete search history.

(56) References Cited

U.S. PATENT DOCUMENTS

| | | | |
|---|---|---|---|
| 5,341,477 A | 8/1994 | Pitkin et al. |
| 5,611,049 A | 3/1997 | Pitts |
| 5,774,660 A | 6/1998 | Brendel et al. |
| 5,892,914 A | 4/1999 | Pitts |
| 6,016,512 A | 1/2000 | Huitema |
| 6,026,452 A | 2/2000 | Pitts |
| 6,052,718 A | 4/2000 | Gifford |
| 6,085,234 A | 7/2000 | Pitts et al. |
| 6,098,096 A | 8/2000 | Tsirigotis et al. |
| 6,108,703 A | 8/2000 | Leighton et al. |
| 6,182,111 B1 | 1/2001 | Inohara et al. |
| 6,185,598 B1 | 2/2001 | Farber et al. |
| 6,192,051 B1 | 2/2001 | Lipman et al. |
| 6,205,475 B1 | 3/2001 | Pitts |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |

(Continued)

FOREIGN PATENT DOCUMENTS

| | | |
|---|---|---|
| CN | 1422468 A | 6/2003 |
| CN | 101189598 A | 5/2008 |
| WO | WO 2007/007960 A1 | 1/2007 |
| WO | WO 2012/044587 A1 | 4/2012 |

OTHER PUBLICATIONS

Kalafut et al., Understanding Implications of DNS Zone Provisioning., Proceeding IMC '08 Proceedings of the 8th ACM SIGCOMM conference on Internet measurement., pp. 211-216., ACM New York, NY, USA., 2008.*

(Continued)

*Primary Examiner* — Wing F Chan
*Assistant Examiner* — Kostas Katsikis
(74) *Attorney, Agent, or Firm* — Knobbe, Martens, Olson & Bear LLP

(57) ABSTRACT

Generally described, the present disclosure is directed to managing request routing functionality corresponding to resource requests for one or more resources associated with a content provider. The processing of the DNS requests by the service provider can include the selective filtering of DNS queries associated with a DNS query-based attack. A service provider can assign DNS servers corresponding to a distributed set of network addresses, or portions of network addresses, such that DNS queries exceeding a threshold, such as in DNS query-based attacks, can be filtered in a manner that can mitigate performance impact on for the content provider or service provider.

33 Claims, 8 Drawing Sheets

U.S. PATENT DOCUMENTS

| | | |
|---|---|---|
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,415,280 B1 | 7/2002 | Farber et al. |
| 6,457,047 B1 | 9/2002 | Chandra et al. |
| 6,484,143 B1 | 11/2002 | Swildens et al. |
| 6,505,241 B2 | 1/2003 | Pitts |
| 6,553,413 B1 | 4/2003 | Lewin et al. |
| 6,560,610 B1 | 5/2003 | Eatherton et al. |
| 6,611,873 B1 | 8/2003 | Kanehara |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 * | 7/2004 | Bero ......................... 709/245 |
| 6,785,704 B1 | 8/2004 | McCanne |
| 6,804,706 B2 | 10/2004 | Pitts |
| 6,810,411 B1 * | 10/2004 | Coughlin et al. ............ 709/203 |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,254,636 B1 | 8/2007 | O'Toole, Jr. et al. |
| 7,260,598 B1 | 8/2007 | Liskov et al. |
| 7,269,784 B1 | 9/2007 | Kasriel et al. |
| 7,289,519 B1 | 10/2007 | Liskov |
| 7,293,093 B2 | 11/2007 | Leighton |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,624,169 B2 | 11/2009 | Lisiecki et al. |
| 7,650,376 B1 | 1/2010 | Blumenau |
| 7,653,700 B1 | 1/2010 | Bahl et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,937,477 B1 | 5/2011 | Day et al. |
| 7,949,779 B2 | 5/2011 | Farber et al. |
| 7,962,597 B2 | 6/2011 | Richardson et al. |
| 7,979,509 B1 | 7/2011 | Malmskog et al. |
| 7,991,910 B2 | 8/2011 | Richardson et al. |
| 7,996,404 B2 | 8/2011 | Wong et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,321,568 B2 | 11/2012 | Sivasubramanian et al. |
| 2001/0032133 A1 | 10/2001 | Moran |
| 2001/0034704 A1 | 10/2001 | Farhat et al. |
| 2001/0049741 A1 * | 12/2001 | Skene et al. .................. 709/232 |
| 2001/0056416 A1 | 12/2001 | Garcia-Luna-Aceves |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0116481 A1 | 8/2002 | Lee |
| 2002/0124098 A1 | 9/2002 | Shaw |
| 2002/0129123 A1 | 9/2002 | Johnson et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0156911 A1 | 10/2002 | Croman et al. |
| 2002/0161767 A1 | 10/2002 | Shapiro et al. |
| 2002/0163882 A1 | 11/2002 | Bornstein et al. |
| 2002/0187935 A1 | 12/2002 | Redmond et al. |
| 2002/0188722 A1 | 12/2002 | Banerjee et al. |

| | | |
|---|---|---|
| 2003/0002484 A1 | 1/2003 | Freedman |
| 2003/0009591 A1 | 1/2003 | Hayball et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0079027 A1* | 4/2003 | Slocombe et al. ............ 709/229 |
| 2003/0099202 A1 | 5/2003 | Lear et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145066 A1 | 7/2003 | Okada et al. |
| 2003/0149581 A1 | 8/2003 | Chaudhri et al. |
| 2003/0163722 A1 | 8/2003 | Anderson, IV |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182413 A1 | 9/2003 | Allen et al. |
| 2003/0182447 A1* | 9/2003 | Schilling ....................... 709/245 |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0236700 A1 | 12/2003 | Arning et al. |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044791 A1 | 3/2004 | Pouzzner |
| 2004/0064501 A1 | 4/2004 | Jan et al. |
| 2004/0073596 A1 | 4/2004 | Kloninger et al. |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0172466 A1 | 9/2004 | Douglas et al. |
| 2004/0194085 A1 | 9/2004 | Beaubien et al. |
| 2004/0194102 A1* | 9/2004 | Neerdaels ..................... 718/100 |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0267906 A1 | 12/2004 | Truty |
| 2004/0267907 A1 | 12/2004 | Gustafsson |
| 2005/0010653 A1* | 1/2005 | McCanne ..................... 709/219 |
| 2005/0021706 A1 | 1/2005 | Maggi et al. |
| 2005/0038967 A1 | 2/2005 | Umbehocker et al. |
| 2005/0044270 A1 | 2/2005 | Grove et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0216569 A1 | 9/2005 | Coppola et al. |
| 2005/0216674 A1 | 9/2005 | Robbin et al. |
| 2005/0232165 A1 | 10/2005 | Brawn et al. |
| 2005/0259672 A1 | 11/2005 | Eduri |
| 2005/0262248 A1 | 11/2005 | Jennings et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0041614 A1 | 2/2006 | Oe |
| 2006/0047787 A1 | 3/2006 | Agarwal et al. |
| 2006/0063534 A1 | 3/2006 | Kokkonen et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0112176 A1 | 5/2006 | Liu et al. |
| 2006/0120385 A1 | 6/2006 | Atchison et al. |
| 2006/0143293 A1 | 6/2006 | Freedman |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0218304 A1 | 9/2006 | Mukherjee et al. |
| 2006/0227740 A1 | 10/2006 | McLaughlin et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259690 A1 | 11/2006 | Vittal et al. |
| 2006/0259984 A1 | 11/2006 | Juneau |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2007/0005689 A1 | 1/2007 | Leighton et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0055764 A1 | 3/2007 | Dilley et al. |
| 2007/0076872 A1 | 4/2007 | Juneau |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0168517 A1 | 7/2007 | Weller et al. |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0253377 A1 | 11/2007 | Janneteau et al. |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0271385 A1 | 11/2007 | Davis et al. |
| 2007/0280229 A1 | 12/2007 | Kenney |
| 2007/0288588 A1* | 12/2007 | Wein et al. .................... 709/214 |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |

| | | |
|---|---|---|
| 2008/0072264 A1 | 3/2008 | Crayford |
| 2008/0082551 A1 | 4/2008 | Farber et al. |
| 2008/0086574 A1 | 4/2008 | Raciborski et al. |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0134043 A1 | 6/2008 | Georgis et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215735 A1 | 9/2008 | Farber et al. |
| 2008/0215750 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0070533 A1 | 3/2009 | Elazary et al. |
| 2009/0086741 A1 | 4/2009 | Zhang et al. |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski, III et al. |
| 2009/0182945 A1 | 7/2009 | Aviles et al. |
| 2009/0187575 A1 | 7/2009 | Dacosta |
| 2009/0204682 A1 | 8/2009 | Jeyaseelan et al. |
| 2009/0210549 A1 | 8/2009 | Hudson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2009/0327489 A1* | 12/2009 | Swildens et al. ............. 709/224 |
| 2009/0327517 A1* | 12/2009 | Sivasubramanian et al. . 709/238 |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0070603 A1 | 3/2010 | Moss et al. |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0125673 A1 | 5/2010 | Richardson et al. |
| 2010/0125675 A1 | 5/2010 | Richardson et al. |
| 2010/0150155 A1 | 6/2010 | Napierala |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0293479 A1 | 11/2010 | Rousso et al. |
| 2010/0299439 A1 | 11/2010 | McCarthy et al. |
| 2010/0332595 A1 | 12/2010 | Fullagar et al. |
| 2011/0040893 A1 | 2/2011 | Karaoguz et al. |
| 2011/0078000 A1 | 3/2011 | Ma et al. |
| 2011/0078230 A1 | 3/2011 | Sepulveda |
| 2011/0153941 A1 | 6/2011 | Spatscheck et al. |
| 2011/0238501 A1 | 9/2011 | Almeida |
| 2011/0238793 A1* | 9/2011 | Bedare et al. ................. 709/220 |
| 2011/0252142 A1 | 10/2011 | Richardson et al. |
| 2011/0258049 A1 | 10/2011 | Ramer et al. |
| 2011/0276623 A1 | 11/2011 | Girbal |
| 2012/0066360 A1 | 3/2012 | Ghosh |
| 2012/0179839 A1 | 7/2012 | Raciborski et al. |

OTHER PUBLICATIONS

International Search Report and Written Opinion in PCT/US2011/053302 mailed Nov. 28, 2011 in 11 pages.
Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
Supplementary European Search Report in Application No. 09727694.3 mailed Jan. 30, 2012 in 6 pages.
International Search Report and Written Opinion in PCT/US2011/061486 mailed Mar. 30, 2012 in 11 pages.
Baglioni et al., "Preprocessing and Mining Web Log Data for Web Personalization", LNAI 2829, 2003, pp. 237-249.
Liu et al., "Combined mining of Web server logs and web contents for classifying user navigation patterns and predicting users' future requests," Data & Knowledge Engineering 61 (2007) pp. 304-330.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.
American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.
Singapore Examination Report in Application No. 201006837-7 mailed May 16, 2012.
First Office Action in Chinese Application No. 200980119993.1 dated Jul. 4, 2012.
First Office Action in Chinese Application No. 200980119995.0 dated Jul. 6, 2012.
First Office Action in Chinese Application No. 200980145872.4 dated Nov. 29, 2012.
Search Report and Written Opinion in Singapore Application No. 201103333-9 mailed Nov. 19, 2012.
Singapore Written Opinion in Application No. 201006836-9, mailed Apr. 30, 2012 in 10 pages.

* cited by examiner

REQUEST ROUTING PROCESSING

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

In some embodiments, the content providers can utilize one or more service providers, such as content delivery network service providers and network storage service providers, to provide services related to the delivery of requested content. In a similar manner, service providers are generally motivated to provide services, such as hosting DNS request processing services or providing content to client computing devices, often with consideration of the efficiency and cost associated with the requested services. For example, service providers often consider factors such as latency of delivery of requested content in processing client computing device requests (either DNS queries or content requests) in order to meet service level agreements or to generally improve the quality of delivered service. In some situations, the service providers may encounter that a number of service requests processed on behalf of a content provider can exceed a threshold, such as in accordance with a malicious attack or beyond an agreed up level of service. In situations related to malicious attacks, such as a DNS-based attack, the level of service provided by the service provider to the targeted content provider can be impacted and in some situations, the overall function of the service provider can be affected.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
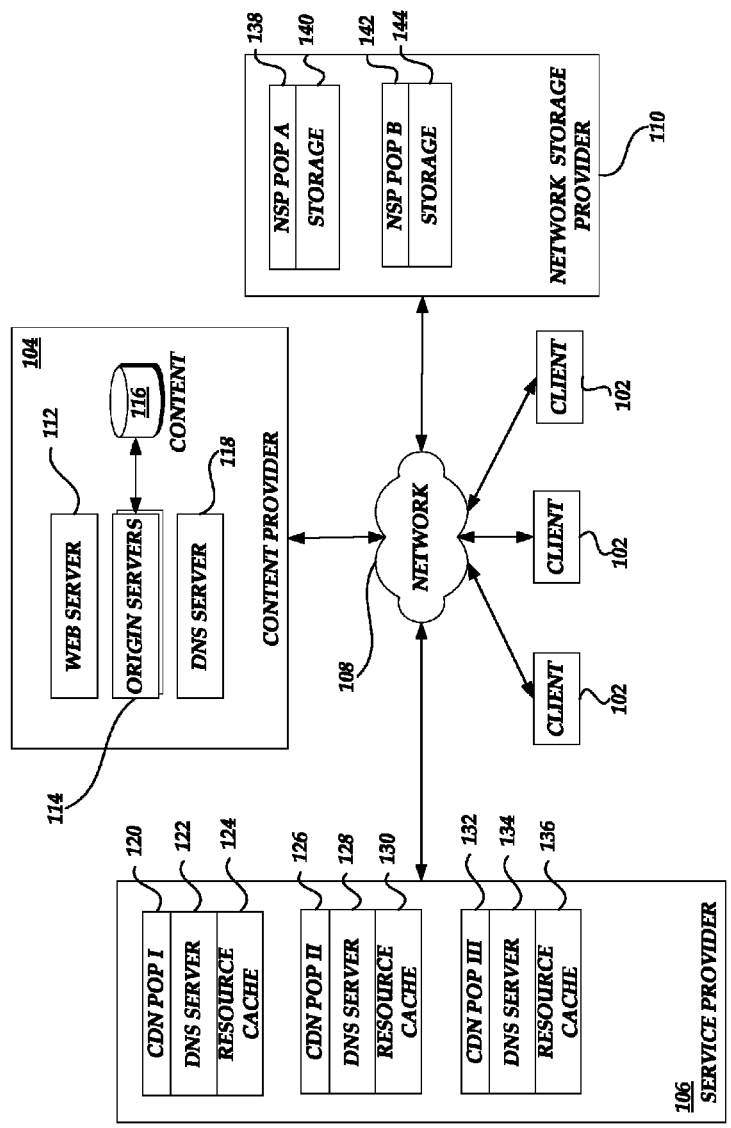
FIG. 1 is a block diagram illustrative of content delivery environment including a number of client computing devices, a content provider, a network storage provider, and a content delivery network service provider.

Generally described, the present disclosure is directed to managing requesting routing functionality corresponding to resource requests for one or more resources associated with a content provider. Aspects of the disclosure will be described with regard to the management and processing of request routing functionality by a service provider, such as a content delivery network ("CDN") service provider, on behalf of an entity requesting the request routing functionality, such as a content provider. Illustratively, the request routing functionality can correspond to the processing, by computing devices associated with the service provider, such as a DNS server component associated with a specific network address, of domain name service ("DNS") requests on behalf of a content provider. The service provider DNS server components resolve the received DNS queries by identifying a network address of a computing device that will provide requested resources, such as a cache component. Additionally, in embodiments in which the number of DNS queries issued to a targeted content provider domain exceeds a threshold, the service provider can selectively filter DNS queries to mitigate the effect of the incoming DNS queries. For example, in situations associated with a DNS query-based attack, some portion of the DNS queries can be filtered to mitigate the effect of the DNS query-based attack.

In one embodiment, the service provider can assign a number of DNS server components that will be authoritative for DNS queries to an identified content provider domain on behalf of a content provider. The assigned DNS server components correspond to network addresses that are selected by the service provider from a distributed set of service provider network addresses in a manner that takes into consideration a number of aspects. In one aspect, the service provider can implement processes for ensuring that no two domains, regardless of the owner, are serviced by service provider DNS server components in which the set DNS server components have matching network addresses. In another aspect, the service provider can implement processes for ensuring that, for a specific domain, the portion of the network addresses of the assigned DNS server components significant for network routing purposes do not having matching values and that the portion of the network addresses of the assigned DNS server component not significant for network routing purposes also do not have matching values.

In embodiments in which the number of received DNS queries exceeds a threshold, such as in DNS query-based attacks, the service provider can implement a number of techniques that results in the filtering of the DNS queries in a manner that can mitigate performance impact associated with the services provided to the content provider domain or the overall performance of the service provider components. For example, the service provider can facilitate the selective filtering of DNS queries from one or more of the ranges of network addresses. In another example, the service provider can facilitate the selective filtering of DNS queries by configuring DNS queries directed toward a specific DNS server network address to be processed by specific DNS server components, such as by forwarding DNS queries.

Although various aspects of the disclosure will be described with regard to illustrative examples and embodiments, one skilled in the art will appreciate that the disclosed embodiments and examples should not be construed as limiting. For example, the present disclosure may be described with regard to request routing services provided by a service provider, such as a CDN service provider, that may provide additional services and functionality including network-based storage services, caching services, and content delivery services. However, one skilled in the relevant art will appreciate that a service provider need not provide all, or any, of the additional services or functionality that may be associated with some service providers, such as a CDN service provider. Likewise, although the present application will be discussed with regard to a content provider as the requestor of services, such as the DNS request processing services, the one skilled in the relevant art will appreciate that the requestor of the service need not provide any additional functionality that may be otherwise attributed to content providers.

FIG. 1 is a block diagram illustrative of content delivery environment 100 for the managing registration of content provider with a service provider, such as a CDN service provider, and subsequent processing of at least a portion of content requests on behalf of the content provider. As illustrated in FIG. 1, the content delivery environment 100 includes a number of client computing devices 102 (generally referred to as clients) for requesting content from a content provider, a network storage provider 110, and/or a service provider 106. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources and the like. Additionally, although the origin server component 114 and associated storage component 116 are logically associated with the content provider 104, the origin server component 114 and associated storage components 116 may be geographically distributed throughout the communication network 108 in a manner to best serve various demographics of client computing devices 102. Still further, although illustrative components have been described with regard to the content provider 104, a content provider may have any configuration of components associated with a domain addressable on the communication network 108.

As further illustrated in FIG. 1, the content provider 104 can be associated with one or more DNS name server components 118 that are operative to receive DNS queries related to registered domain names associated with the content provider. The one or more DNS name servers can be authoritative to resolve client computing device DNS queries corresponding to the registered domain names of the content provider 104. A DNS name server component is considered to be authoritative to a DNS query if the DNS name server can resolve the query by providing a responsive IP address. As will be explained in greater detail below, in accordance with illustrative embodiments, at least a portion of the request routing functionality provider the DNS name server components 118 will be provided by a service provider on behalf of the content provider 104.

With continued reference to FIG. 1, the content delivery environment 100 can further include a service provider 106 in communication with the one or more client computing devices 102, the content provider 104, and the network storage provider 110 via the communication network 108. The service provider 106 illustrated in FIG. 1 corresponds to a logical association of one or more computing devices associated with a service provider. Specifically, the service provider 106 can include a number of Point of Presence ("POP") locations 120, 126, 132 that correspond to nodes on the communication network 108. Each POP 120, 126, 132 includes a DNS component 122, 128, 134 made up of a number of DNS server computing devices for resolving DNS queries from the client computers 102. Each POP 120, 126, 132 also optionally includes a resource cache component 124, 130, 136 made up of a number of cache server computing devices for storing resources from content providers or network storage providers and transmitting various requested resources to various client computers. The DNS components 122, 128, 134 and the resource cache components 124, 130, 136 may further include additional software and/or hardware components that facilitate communications including, but not limited, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the service provider 106 can be associated with various additional computing resources, such additional computing devices for administration of content and resources, and the like.

With further continued reference to FIG. 1, the content delivery environment 100 can also include a network storage provider 110 in communication with the one or more client computing devices 102, the service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 142 that correspond to nodes on the communication network 108. Each NSP POP 138, 142 includes a storage component 140, 144 made up of a number of storage devices for storing resources from content providers which will be processed by the network storage provider 110 and transmitted to various client computers. The storage components 140, 144 may further include additional software and/or hardware components that facilitate communications including, but not limited to, load balancing or load sharing software/hardware components.

In an illustrative embodiment, the storage components 140, 144 are considered to be logically grouped, regardless of whether the components, or portions of the components, are physically separate. Additionally, although the NSP POPs 138, 142 are illustrated in FIG. 1 as logically associated with the network storage provider 110, the NSP POPs will be geographically distributed throughout the communication network 108 in a manner to best serve various demographics of client computing devices 102. Additionally, one skilled in the relevant art will appreciate that the network storage provider 110 can be associated with various additional computing resources, such additional computing devices for administration of content and resources, DNS name servers, and the like.

Even further, one skilled in the relevant art will appreciate that the components of the network storage provider 110 and components of the service provider 106 can be managed by the same or different entities. One skilled in the relevant art will also appreciate that the components and configurations provided in FIG. 1 are illustrative in nature. Accordingly, additional or alternative components and/or configurations, especially regarding the additional components, systems, and subsystems for facilitating communications may be utilized. Specifically, one skilled in the relevant art will appreciate the network storage provider 110 may be omitted from the content delivery environment 100.

With reference now to FIGS. 2-5B, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
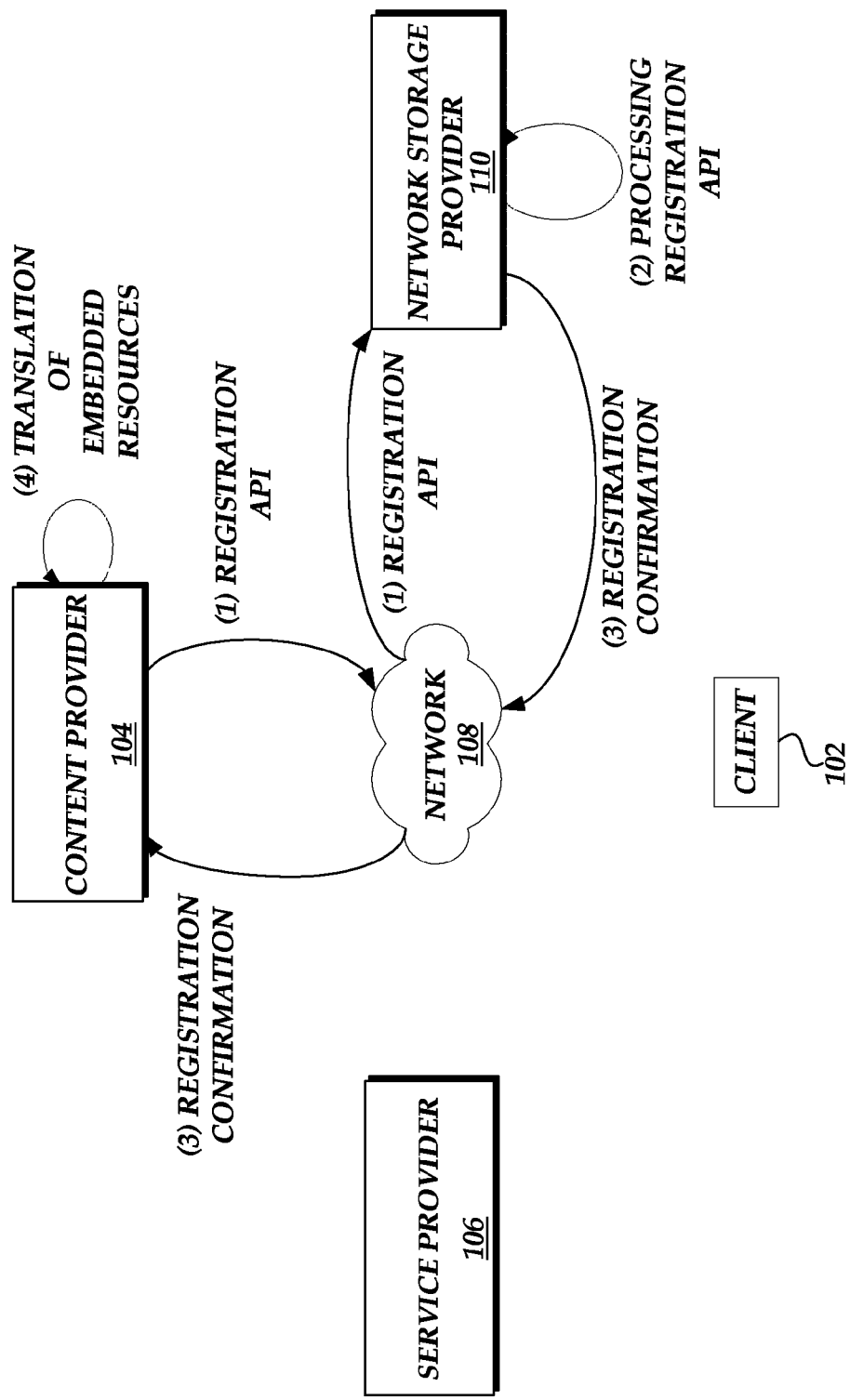
FIG. 2 is a block diagram of the content delivery environment of FIG. 1 illustrating the registration of a content provider with a network storage provider.

With reference to FIG. 2, an illustrative interaction for the optional registration of a content provider 104 with the network storage provider 110 for hosting content on behalf of the content provider 104 will be described. As illustrated in FIG. 2, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API can include the identification of the origin server 114 of the content provider 104 that may provide requested resources to the network storage provider 110. In addition or alternatively, the registration API can include the content to be stored by the network storage provider 110 on behalf of the content provider 104. In one embodiment, the network storage provider 110 may act as an origin server for the content provider 104.

With continued reference to FIG. 2, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

In one embodiment, the network storage provider 110 returns an identification of applicable domains for the network storage provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 114 to a domain corresponding to the network storage provider 110. The translated URLs are embedded into requested content in a manner such that DNS queries for the translated URLs will resolve to a DNS server corresponding to the network storage provider 110 and not a DNS server corresponding to the content provider 104.

Figure 3:
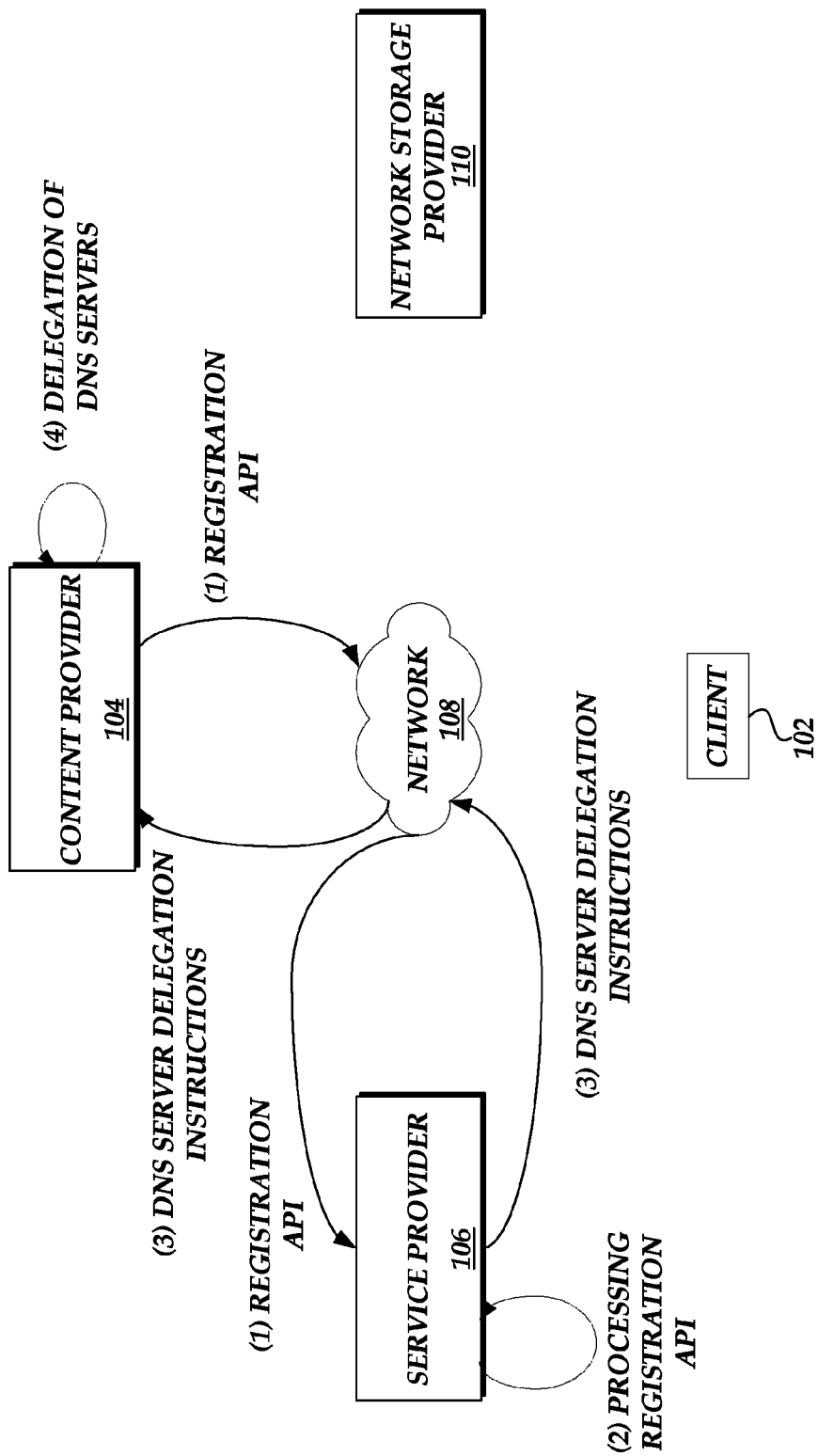
FIG. 3 is a block diagram of the content delivery environment of FIG. 1 illustrating the registration of a content provider with a service provider for providing request routing services on behalf of the content provider.

With reference now to FIG. 3, an illustrative interaction for registration, by the content provider 104, to utilize the request routing services provided by the service provider 106 will be described. As illustrated in FIG. 3, the request routing service registration process provided by the service provider 106 begins with registration of the content provider 104 with the service provider 106. In an illustrative embodiment, the content provider 104 utilizes a registration API to register with the service provider 106 such that the service provider 106 can provide request routing services on behalf of the content provider 104. The registration API includes the identification of the domains for which the service provider 106 will be authoritative (e.g., "contentprovider.com"), the identification of the storage component 140, 144 of the network storage provider 110 or origin servers 114 that will provide requested resources to the client computing devices 102. The registration API can also include additional information including request routing information, identification information, or other information that will be used to resolve client computing device DNS requests on behalf of the content provider 104, as will be explained below.

The service provider 106 obtains the registration API and processes the information. In one aspect, the service provider 106 can generate the necessary request processing rules or alternative identifiers that may be utilized in the resolution of client computing device DNS queries. In another aspect, the service provider 106 can cause the registration of its DNS name server components for the relevant domains specified by the content provider 104. The service provider 104 can then send a response to the content provider 104, such as a confirmation. Responsive to the processing of the registration API, the service provider 106 can identify the network addresses of the service provider DNS servers, such as an Internet Protocol address, that will process DNS queries on behalf of the content provider 104. The content provider 104 can then delegate the identified network addresses of the DNS servers that will be responsible for the identified content provider domain (e.g., "contentprovider.com").

As will be explained in greater detail below, in one embodiment, the service provider 106 can distribute, or otherwise assign, network addresses associated with the DNS server components that will be authoritative to DNS requests to the content provider domain. Specifically, in embodiments in which the service provider 106 will assign a number of DNS server components that will be authoritative for a content provider domain, the service provider can first create a number of subdivisions, or zones, of network addresses available to the service provider. The number of subdivisions or zones corresponds to a distribution of the network addresses such that a selection of a network address from each of the subdivisions or zones ensures that a particular domain's DNS server components have distributed network addresses and avoids situations in which any two assigned DNS server components would have completely overlapping, or exactly matching, network addresses (unless the number of subdivisions or zones is less than the number of DNS server components being assigned as authoritative for a domain). The distribution from different subdivisions can be generally referred to as a "non-overlapping distribution."

For purposes of an illustrative example, assume that the service provider 106 has a pool of available network addresses. The service provider 106 can organize the pool into two or more ranges of network addresses. For example, the ranges can be defined in a manner such that each network address having a common highest ordered octet could be considered to be in the same range. In another example, the ranges can be defined in a manner such two or more ranges may share a common highest ordered octet, but are distinguished by different second octets. Further, in another embodiment, the ranges of network addresses can correspond to a number of network addresses available for assignment. In alternative embodiments, at least one range of network address can correspond to a single network address for assignment.

As discussed above, each range of network addresses can be considered a subdivision or zone of the available network addresses. In one aspect, if the number of subdivisions is equal or greater than the number of network addresses that need to be assigned, the service provider 106 ensures a distribution of network addresses for the DNS server components such that no two network addresses will be matching by selecting a network address from different subdivisions. With reference to the previous example in which ranges are determined according to the highest ordered octet of the network address, each selected network address would correspond to a different value of the highest order octet, which ensures that at least that portion of the network addresses do not overlap (e.g., the second, third, fourth octets) and that no two network addresses for the particular domain will be matching. With reference to another example in which two ranges share common first and second octets, each selected network address would correspond to a different value of the third order octet, which still ensures that at least that portion of the network addresses do not overlap and that no two network addresses for the particular domain will be matching. Depending on the pool of network addresses available to the service provider 106, the ranges of network addresses associated with each subdivision or zone can be configured in various manners depending on the desired distribution of network addresses, the total number of available network addresses and the differences in values among the available network addresses.

In some embodiments, in addition to ensuring a "non-overlapping" distribution of assigned network addresses for a specific domain, if the service provider 106 processes multiple requests for different domains, there is the possibility that such a non-overlapping distribution could result in two or more different domains having at least one assigned DNS network address that matches. In some embodiments, the service provider 106 may wish to establish a threshold number of network addresses that can be matched across unrelated domains (e.g., one, two, three, etc.) or, conversely, a minimum number of network addresses that are not exactly matching between any two non-related domains. Accordingly, the service provider 106 can include different levels of processing regarding any potentially matching assigned network address in accordance with the established threshold of number of acceptable matching network addresses.

In one embodiment, if the threshold is set to zero such that there can be no matching network addresses, the service provider 106 can ensure that the assigned network addresses of DNS servers do not overlap by removing a DNS server's network address from the pool of available network addresses has been assigned. One example of such a scenario is if there are two or more hosted domains that have a common name (e.g., www.domain.com) and therefore, cannot have any matching DNS server component network addresses. In another embodiment, it may be possible for two domains to share one or more assigned network address of a DNS server component. However, it may be desirable for the service provider 106 to ensure that no two specific domains are assigned the exact same network addresses from each of the subdivisions or that, for any two domains, no more than half of the assigned DNS server component network addresses are matching. In such embodiments, the service provider 106 can conduct additional processing to ensure and correct for matching network addresses, such as by reducing the number of matching network addresses below the threshold.

In addition to ensuring that assigned network addresses for a specific domain are distributed in a non-overlapping manner and further ensuring that the number of matching network addresses with regard to another domain are not above a threshold, in another embodiment, the service provider 106 can select portions of the selected network addresses from each subdivision such that there is further no overlap in the portions of the selected network addresses that are not typically considered significant for purposes of routing. Specifically, in one embodiment, the network addresses can corresponds to a number of bits that are divided into octets having unique values. For example, a 16-bit network address can be represented in the form of xx.xx.xx.xx in which each xx pair is an octet. Likewise, a 24-bit network address can be represented in the form of yy.yy.yy.yy.yy.yy in which each yy pair represented by four bits. In accordance with network routing principles, a portion of the network address is utilized for network routing (e.g., the first 2 or 3 octets) and is generally referred to as the "most significant portion of the network address" or the "network portion of the network address." The remaining portion of the network address (e.g., the last octet) is not considered to be significant for purposes of network routing and is generally referred to as the "non-significant portion of the network address" or the "host portion of the network address." One skilled in the relevant art will appreciate that the number of octets in a network address that are considered "significant" or "non-significant" may vary according to the specific network protocol being utilized, the configuration of network routing equipment, and other criteria. Accordingly, the example number of octets utilized to illustrate the difference between the significant and non-significant portions of a network address are illustrative in nature and should not be construed as limiting.

For purposes of network routing, network addresses are considered to be non-overlapping or non-matching so long as the significant portions of the network addresses do not exactly match, regardless of whether there are one or more matching octets. The non-significant portions of the network address are effectively ignored for purposes of network routing. Accordingly, in this embodiment, the service provider 106 can select different values for the non-significant portions of the selected network addresses for a specific domain such that there is also no overlap the non-significant portions of the selected network address for a specific domain do not exactly match, even if there is some partial matching.

With reference to the previous example, if we assume that four network addresses are selected and the non-significant portion of the network addresses correspond to the last octet in the network address, the non-significant portion of the network addresses can be subdivided into four ranges of values such there is no overlap in the assigned values for the least most significant bits. Continuing with this example, the last octet has a range of 256 total potential values. Since each domain is illustratively associated with four network addresses, the potential values of the last octet can be divided into ranges of values of 1-63, 64-127, 128-191, and 192-255. Accordingly, the value of the last octet for the first assigned network address would be picked from the range of 1-63; the value of the last octet for the second assigned network address would be picked from the range of 64-127; the value of the last octet for the third assigned network address would be picked from the range of 128-191; and the value of the last octet for the fourth assigned network address would be picked from the range of 192-255. Thus, in this embodiment, the resulting assigned network addresses would be completely non-overlapping with regard to not only the significant portions of the network addresses but also with regard to the non-overlapping portions of the network addresses.

In the event that a number of DNS queries exceed a threshold, such due to a DNS query based attack or due to a spike in requests, the service provider 106 can selectively filter DNS queries from one or more selected network address. If the "excessive" DNS queries are targeted toward a specific content provider, the service provider 106 may be able to maintain some DNS query functionality by filtering out less than all the assigned subdivisions for the targeted domain. Additionally, the service provider 106 can also mitigate the impact of such excessive DNS queries to the request routing services provided to other non-targeted content providers by filtering out some or all of the assigned subdivisions for the targeted domain or by limiting the processing of DNS queries to a targeted domain to specific physical computing devices. Still further, the service provider 106 can forward some portion of the DNS queries to different points of presence or DNS server components to help mitigate the impact of the number of DNS queries.

Illustratively, upon the optional identification of appropriate storage component 140, 144, 148 of the network storage provider 110 and the registration for request routing functionality with the service provider 106, the content provider 104 can, in one embodiment as will be further described below in reference to FIGS. 4 and 5A and 5B, begin to process DNS requests for content generated on behalf of the client computing devices 102. Specifically, in accordance with DNS routing principles, a client computing device DNS query corresponding to a resource identifier would eventually be resolved by identifying a network address corresponding to either the origin server component 114 and associated storage component 116 or storage component 140, 144 of the network storage provider 110 by a DNS name server associated with the service provider 106.

Figure 4:
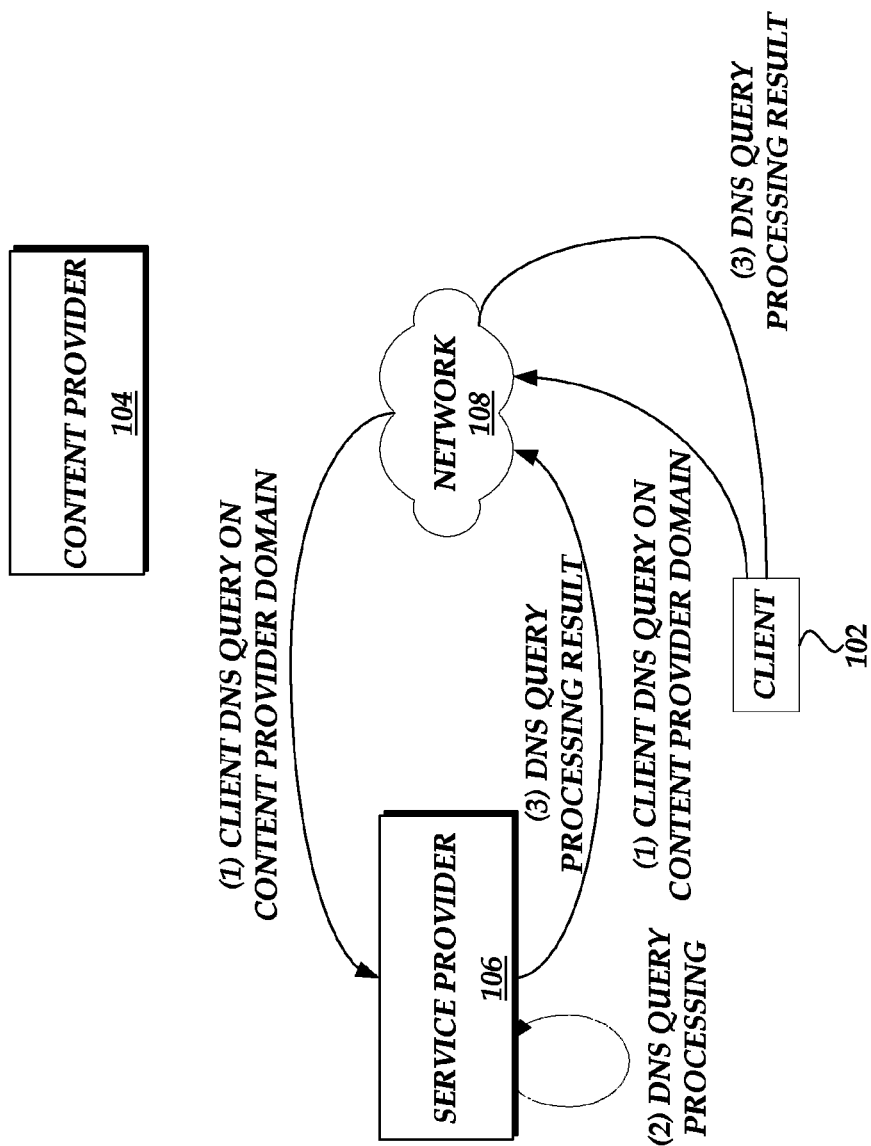
FIG. 4 is a block diagram of the content delivery environment of FIG. 1 illustrating the processing of request routing requests by a service provider on behalf of the content provider.

Turning now to FIG. 4, in accordance with one embodiment once the service provider 106 has begun processing request routing functionality on behalf of the content provider, a client computing device 102 issues a DNS query for the content provider domain (e.g., "contentprovider.com"). Illustratively, the client computing device 102, such as through a browser software application, issues a DNS query for the content provider domain that first results in the identification of a DNS server authoritative to the "." and the "com" portions of the domain. After partially resolving the domain according to the "." and "com" portions of the domain, the client computing device 102 then issues another DNS query for the URL that results in ".contentprovider" portion of the domain. The issuance of DNS queries corresponding to the "." and the "com" portions of a domain are well known and have not been illustrated.

In an illustrative embodiment, the identification of the identification of a DNS server authoritative to the "contentprovider" corresponds to one of the assigned IP addresses of a DNS server associated with the service provider 106. In one embodiment, the IP address is a specific network address unique to DNS server component(s) of a specific POP associated with the service provider 106. In another embodiment, the IP address can be shared by one or more POPs associated with the service provider 106, which may be geographically or logically distributed. In this embodiment, a DNS query to the shared IP address utilizes a one-to-many network routing schema, such as anycast, such a specific POP will receive the request as a function of network topology. For example, in an anycast implementation, a DNS query issued by a client computing device 102 to a shared IP address will arrive at a DNS server component of the service provider 106 logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a service provider POP.

As illustrated in FIG. 4, a DNS server component of the service provider 106 obtains the DNS query and can resolve the DNS query by providing a network address, such as an IP address, of a component for providing the request content. For example, the receiving DNS server component may provide an IP address of a Web server that can provide a requested Web page. In another example, the DNS server may provider an IP address of a cache component that may provide a request resource or file. In an alternative embodiment, the DNS server component may also provide alternative identifiers, such as canonical names ("CNAMES") that can be used to refine request routing processing. In the example illustrated in FIG. 4, it is assumed that the DNS query transmitted by the client computing device 102 can be processed.

Figure 5A:
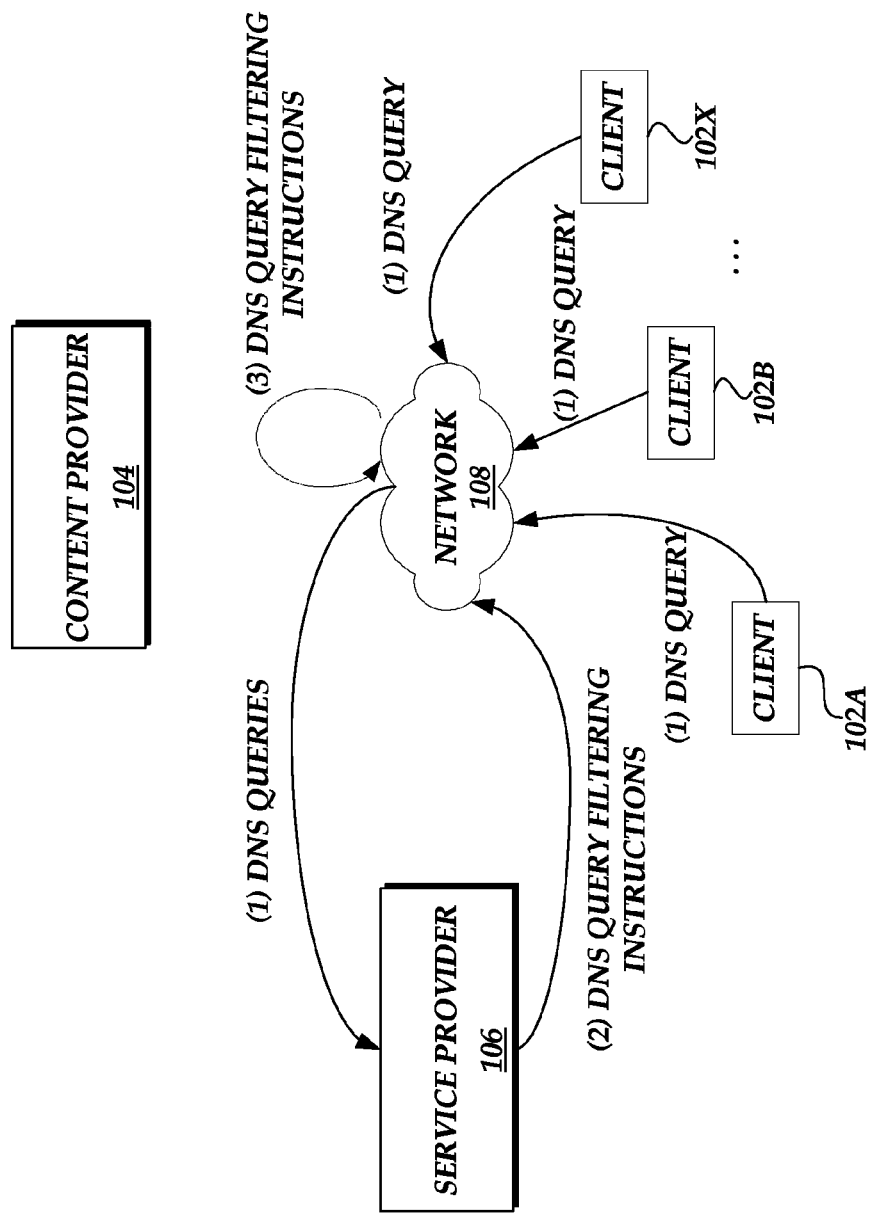
FIGS. 5A and 5B are block diagrams of the content delivery environment of FIG. 1 illustrating one embodiment of the processing of resource routing requests generated by client computing devices.
Figure 5B:
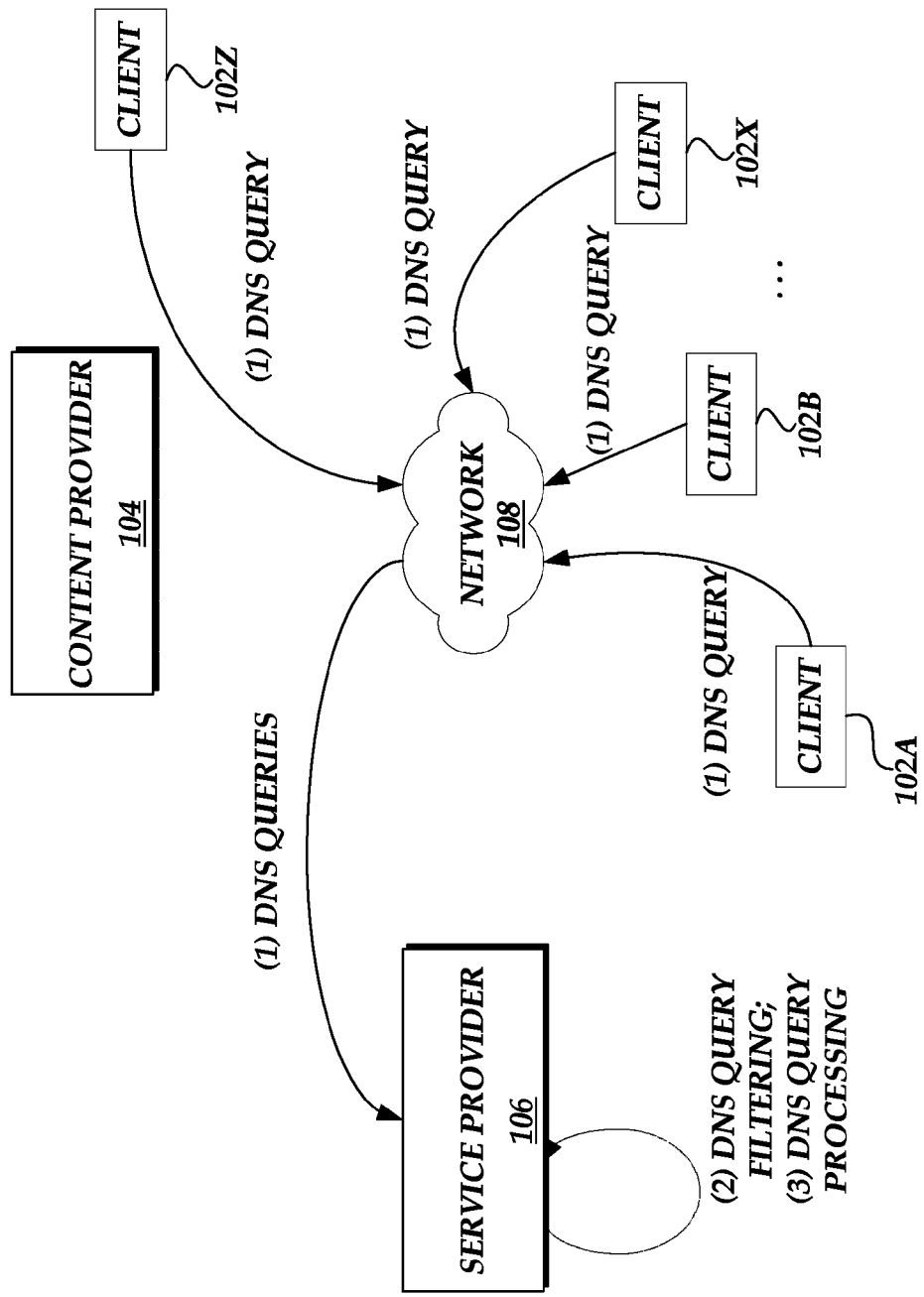

Turning now to FIGS. 5A and 5B, in other embodiments, the service provider 106 may obtain a number of DNS queries for a domain such that the number of DNS queries exceeds a threshold. As illustrated in FIG. 5A, exceeded threshold may be indicative of a DNS-based network attack in which multiple client computing devices 102 attempt to overload a content provider domain with DNS queries. The exceeded threshold may also be indicative of spikes in content requests or correspond to a number of DNS queries that exceeds agreed upon service levels. In one aspect, the multiple DNS queries may be directed to one of the specific assigned network addresses of the DNS server components processing DNS queries on behalf of the content provider 104. In another aspect, the multiple DNS queries may be directed to all the specific assigned network addresses for the content provider 104. Still further, in another aspect, the multiple DNS queries may not be targeted only to a specific content provider domain and may be indicative of a larger, network based attack.

In order to mitigate the impact of the DNS queries that have exceeded a threshold (or will exceed a threshold), the service provider 106 can begin causing the selective filtering at least portions of the DNS queries directed to one or more of the assigned network addresses. Specifically, in one embodiment, the service provider 106 can issue commands or utilize routing protocols that cause DNS queries to be filtered in the communication network 108 prior to being received by the service provider 106. For example, the service provider 106 can utilize a null route injection for identified network addresses that networking equipment, such as routers, to prevent the forwarding of the DNS queries.

With reference to FIG. 5B, in addition to the filtering of DNS queries in the communication network 108, the service provider 106 can utilize router access control lists to filter, or otherwise block, DNS queries directed to one or more of the assigned network address subdivisions or zones that are received at the service provider. If the DNS queries associated with the exceeded threshold are targeted to a particular subdivision or zone, the service provider 106 can further filter the excessive DNS queries to the targeted network address. If the DNS queries associated with the exceeded threshold are targeted to a larger number of subdivisions or zones, the service provider 106 can filter all the targeted domains to effectively stop queries.

Alternatively, the service provider can filter a percentage of zones in an effort to maintain a percentage DNS query processing functionality. For example, if a content provider 104 has been associated with a DNS server component for each of four zones, the service provider 106 can filter half of the assigned network addresses to maintain operation of the request routing functionality at least at a fifty percent level. As illustrated in FIG. 5B, by filtering only certain network address zones, at least some portion of DNS queries for the "targeted" content provider or other content providers, such as by client computing device 102Z can continued to be processed. Additionally, the service provider 106 can configure one or more specific DNS server components to process any remaining DNS queries that have not been filtered in the communication network 108 or by the service provider. Still further, the server provider 106 can forward at least a portion of the non-filtered DNS queries to other DNS server components that may be better suited to process the non-filtered DNS queries or to distribute the load at a specific POP.

Figure 6:
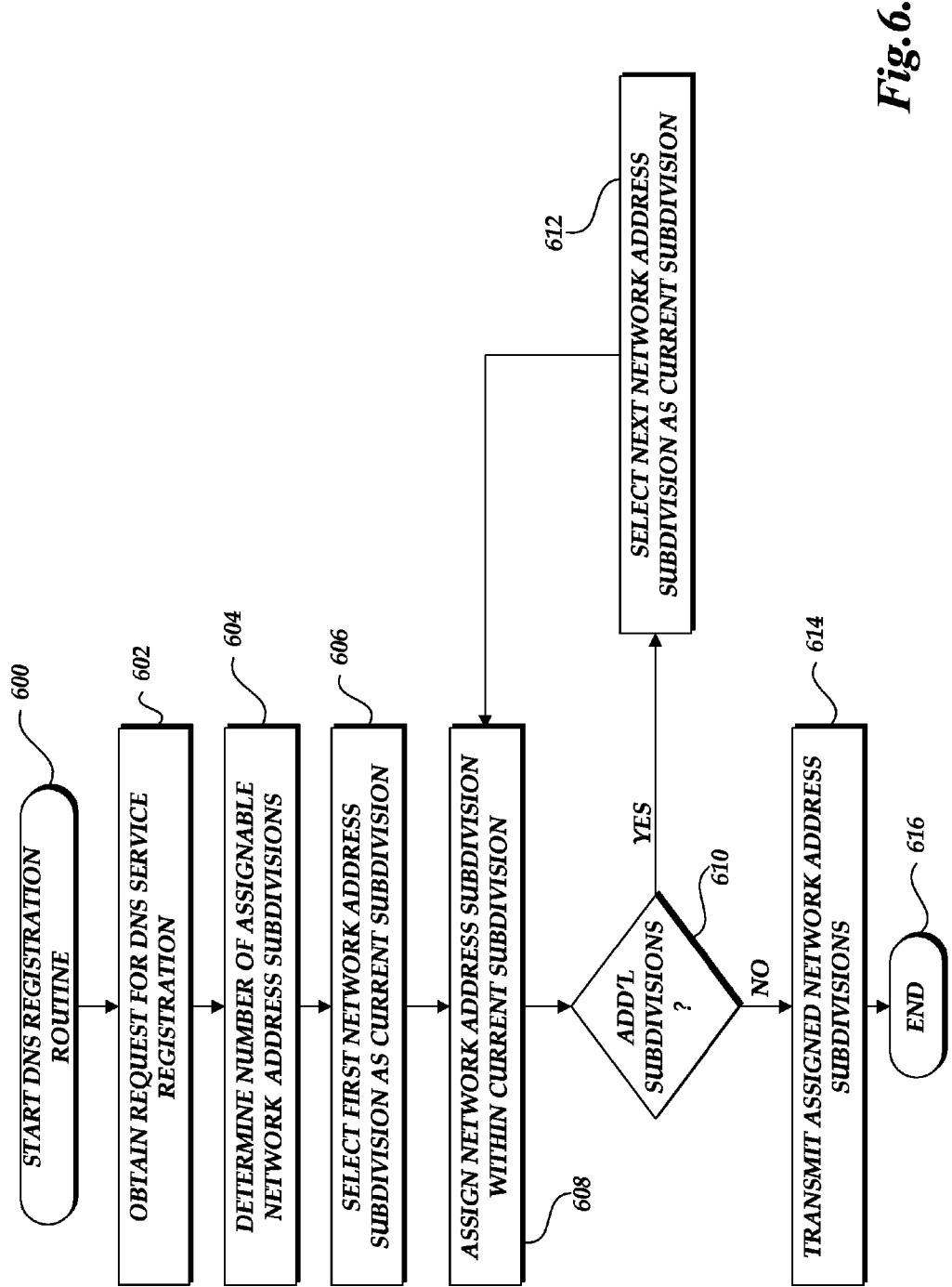
FIG. 6 is a flow diagram illustrative of a content provider request routing registration processing routine implemented by a service provider.

With reference now to FIG. 6, one embodiment of a routine 600 implemented by a service provider 106 for managing registration of content provider 104 will be described. One skilled in the relevant art will appreciate that actions/steps outlined for routine 600 may be implemented by one or many computing devices/components that are associated with the service provider 106, such as a DNS query processing component or a point of presence associated with the service provider. Accordingly, routine 600 has been logically associated as being generally performed by the service provider 106, and thus the following illustrative embodiments should not be construed as limiting.

At block 602, the service provider 106 obtains a request for providing DNS request routing services on behalf of a content provider 104. Illustratively, the request for providing DNS request routing services may be facilitated through a registration API in which the content provider specifies information necessary for the service provider 106 to begin hosting DNS name server functionality on behalf of the content provider. The transmission of the registration API (and associated information) may be an automatic process corresponding to an exchange of information between computing devices without need for administrator, or other human interaction. Alternatively, the transmission of the registration API (and associated information) may be an automatic, a manual, or a semi-manual process in which an administrator specifies at least a portion of the information necessary for the service provider 106 to begin hosting DNS name server functionality on behalf of the content provider.

At block 604, the service provider 106 determines a number of assignable network address subdivisions or zones. As previously described, in one embodiment, the service provider 106 may maintain two or more ranges of DNS server network addresses that can be assigned to content providers. Illustratively, the service provider can maintain a pool of available network addresses that correspond to the DNS server components that can be assigned to a content provider. Accordingly, the service provider 106 can organize the pool into two or more ranges of network addresses in which each range of network addresses corresponds to a subdivision or zone. As explained above, the service provider 106 can further select network addresses from the subdivisions to ensure that, for a specific domain, at least the significant portions of the set of assigned network addresses will not have any exactly matching values, regardless of whether is at least some common values.

At block 606, the first network address subdivision is selected as a current network address subdivision and at block 608, the service provider 106 assigns a network address from the current network address subdivision. In an illustrative embodiment, in addition to the selection of a unique network address from the range of network addresses associated with the current network address subdivision, block 608 can also correspond to the service provider 106 selecting a value for the non-significant portion of the selected network addresses such that for a specific domain, at least the non-significant portions of the set of assigned network addresses also will not have any exactly matching values. One skilled in the relevant art will appreciate that the non-significant portions of the set of assigned network addresses will not be considered matching solely because some portion of the network addresses have common values. Still further, block 608 can also correspond to the service provider 106 conducting additional processing such that for two domains, regardless of ownership, the set of assigned network addresses (either significant portions or a combination of significant and non-significant portions) will have more than a threshold number of exactly matching network addresses. Additionally, the service provider 106 can also conduct some type of conflict resolution such that the assigned network address would not conflict with a previously assigned network address for any domain that would be considered a parent domain, a child domain, a sibling domain, etc. In such embodiment, the pool of available network addresses may be filtered to remove any potentially conflicting network addresses.

At decision block 610, a test is conducted to determine whether additional network subdivisions exist. If so, at block 612, the service provider 106 selects a next network address subdivision as the current network address subdivision and the routine 600 proceeds to block 608 to select another network address for the current subdivision. With reference to the previous example, the routine 600 can repeat to assign a network address for each of the remaining three network address subdivision ranges and values for the non-significant portions of the network address (e.g., ranges of 64-127, 128-191, and 192-254 for the last octet of the assigned network addresses). Additionally, the routine 600 can provide the additional conflict resolution or other limitation techniques, described above, to filter out network addresses that should not be assigned to the content provider. However, in an alternative embodiment, the service provider 106 may not necessarily assign network addresses from all the available network address subdivisions or zones.

Once all the network addresses have been assigned, at block 614, the service provider 106 transmits assigned network addresses in response to the request for DNS service hosting. Based on the identified network addresses, the content provider can delegate the identified domain to the assigned network addresses. One skilled in the relevant art will appreciate that upon delegation of the assigned network addresses (or DNS name server names), the service provider 106 can host the DNS name server components on different computing devices in a manner that each physical computing device can correspond to one subdivision or zone or less than all the subdivisions or zones. At block 616, the routine 600 ends.

Figure 7:
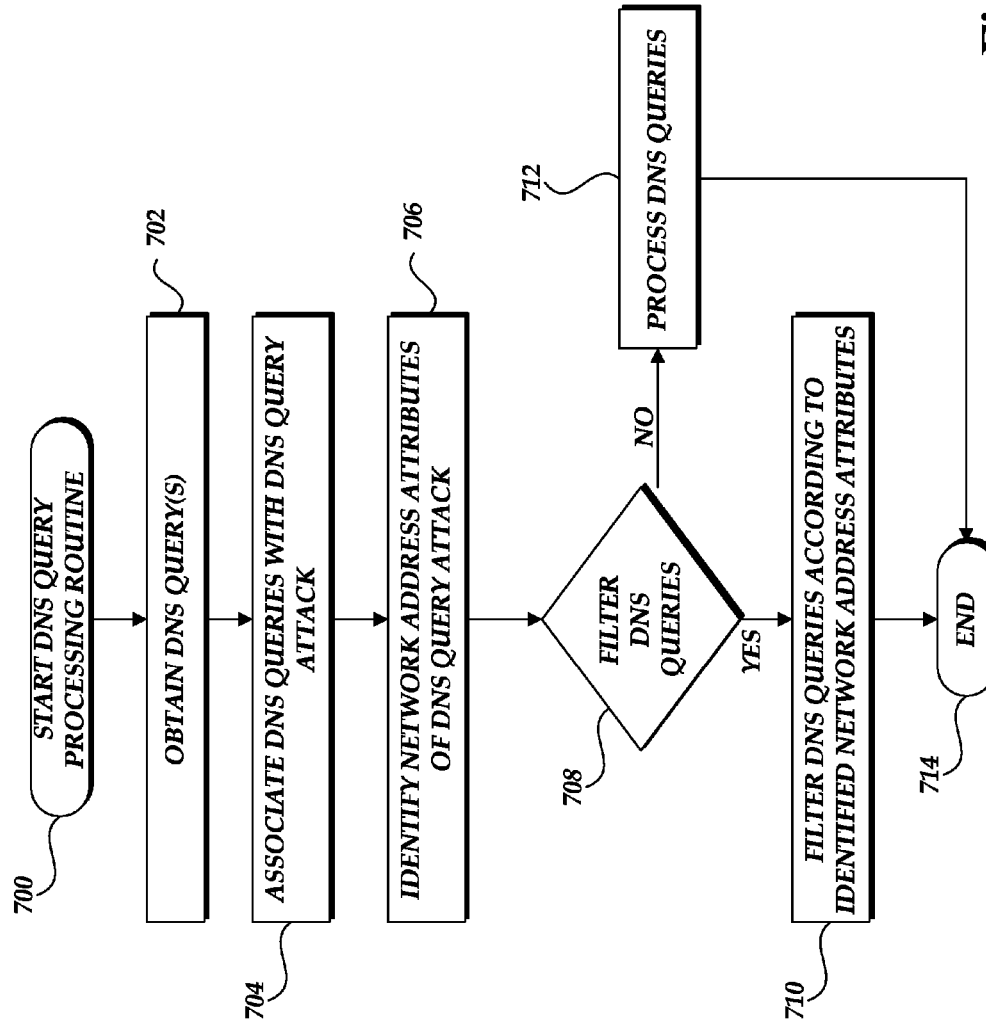
FIG. 7 is a flow diagram illustrative of a request routing processing routine implemented by a service provider.

With reference now to FIG. 7, one embodiment of a routine 700 implemented by the service provider 106 for processing DNS requests will be described. Similar to FIG. 6, one skilled in the relevant art will appreciate that actions/steps outlined for routine 700 may be implemented by one or many computing devices/components that are associated with the service provider 106. Accordingly, routine 700 has been logically associated as being generally performed by the service provider 106, and thus the following illustrative embodiments should not be construed as limiting.

At block 702, the service provider 106 obtains one or more DNS queries from client computing devices 102. Illustratively, the DNS queries are described as originating from separate client computing devices 102. However, at least some portion of the DNS queries may be transmitted by the same client computing device 102 or from some other component configured in a manner to generate multiple DNS queries. Additionally, in an alternative embodiment, the service provider 106 may receive an indication as to the number of DNS queries being transmitted without actual receipt of the DNS queries by the service provider.

At block 704, the service provider 106 associates the DNS queries with a set of DNS queries that have exceeded a threshold. As previously described, the exceeded threshold may be indicative of a DNS-based network attack in which multiple client computing devices 102 attempt to overload a content provider domain with DNS queries. The exceeded threshold may also be indicative of spikes in content requests or correspond to a number of DNS queries that exceeds agreed upon service levels. In one aspect, the multiple DNS queries may be directed to a specific assigned network address for the content provider 104. In another aspect, the multiple DNS queries may be directed to all the specific assigned network addresses for the content provider 104. Still further, in another aspect, the multiple DNS queries may not be targeted only to a specific content provider domain and may be indicative of a larger, network based attack. One skilled in the relevant art will appreciate that the association of the DNS queries may also be determined by criteria other than the number of DNS queries, such as by the source of the DNS query (e.g., from a known bad actor or IP address) or based on signature mapping of the DNS query (e.g., known identification information in the DNS query).

At block 706, the service provider 106 determines network address attributes of the DNS queries that have exceeded the threshold (e.g., the "DNS query attack"). In one aspect, the service provider 106 may identify all the specific network addresses that have been targeted. In another aspect, the service provider 106 may determine a percentage of targeted network addresses to attempt to block or filter. At decision block 708, a test is conducted to determine whether to filter the received DNS queries. As previously described, the service provider 106 may attempt to filter all DNS queries to a particular network address if only a portion of the network addresses associated with a content provider are targeted or based on a determination that the service provider request routing services would be compromised. In another example, if multiple network addresses are targeted the service provider 106 may determine to filter a percentage of the network address to maintain some request routing functionality on behalf of the content provider 104.

If the service provider 106 determines to filter the DNS queries, at block 710, the service provider filters, or otherwise blocks, the DNS queries. In one embodiment, the service provider 106 may utilize a communication or routing protocol to cause network-based equipment, such as routers, to filter all DNS queries corresponding to an identified IP address prior to being received by the service provider. As previously described, an example of such a routing protocol would be the utilization of null route injection command/information. In another embodiment, the service provider 106 can filter the DNS queries as they are received by the service provider network. For example, the service provider can utilize router access control lists that can be configured to block requests to specific network addresses as the requests are received by the routers. Alternatively, if the service provider 106 determines not to filter, the service provider, through a receiving DNS server component, processes the received DNS query. As previously described, the service provider can configure specific hardware computing devices to be responsive to any non-blocked network addresses. In a further embodiment, the service provider 106 can also direct DNS queries targeted to one or more assigned network addresses to specific DNS components within the service provider network. For example, the service provider 106 can forward one or more DNS queries via the communication network, such as a communication tunnel. At block 714, the routine 700 ends.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing DNS queries comprising:
   obtaining, by a service provider, a request for hosting DNS query services for an identifiable domain;
   determining, by the service provider, a number of assignable network address subdivisions, wherein each network address subdivision corresponds to a range within a pool of available network addresses for service provider DNS server computing devices;
   assigning, by the service provider, a network address in each of the determined network address subdivisions, wherein the assigned network addresses from each subdivision for the identifiable domain are not matching; and
   transmitting, by the service provider, the assigned network address for each determined network address subdivision, wherein DNS server computing devices corresponding to the assigned network addresses will be delegated to be authoritative to respond to DNS queries for the identifiable domain.

2. The method as recited in claim 1, wherein each network address subdivision corresponds to one of four ranges of available network addresses for service provider DNS server computing devices.

3. The method as recited in claim 2, wherein the four ranges of available network addresses are evenly distributed.

4. The method as recited in claim 1, wherein assigning the network address in each of the determined network address subdivisions includes selecting a network address from each determined network address subdivision such that the significant portion of the assigned networks addresses do not match.

5. The method as recited in claim 1, wherein assigning the network address in each of the determined network address subdivisions further includes preventing the assignment of network addresses that results in the matching of a threshold number of significant portions of the assigned network addresses between the identifiable domain and other domains.

6. The method as recited in claim 5, wherein the threshold number of network addresses is defined such that between the identifiable domain and the other domains, there is at least one significant portion of the assigned network addresses that does not match.

7. The method as recited in claim 1, wherein assigning the network address in each of the determined network address subdivision includes performing conflict resolution removing one or more network addresses not available to be assigned due to domain based conflicts.

8. The method as recited in claim 1, wherein assigning the network address in each of the determined network address subdivision includes assigning a uniquely named DNS server that has been previously associated with the identified network address.

9. The method as recited in claim 1, wherein assigning the network address in each of the determined network address subdivisions includes selecting a non-significant portion of each assigned network address such that a threshold number of the non-significant portions of the network addresses for the identifiable domain are not matching.

10. The method as recited in claim 9, wherein the threshold number of non-matching non-significant portions of network addresses includes all the assigned network addresses such that for the identifiable domain, none of the non-significant portions of all the assigned network addresses match.

11. The method as recited in claim 1, wherein the network addresses correspond to Internet protocol network addresses.

12. A system for managing DNS queries comprising:
    a DNS query processor device, at a service provider, operative to:
    obtain, by the service provider, a request for hosting DNS query services for an identifiable domain;
    determine, by the service provider, a number of assignable network address subdivisions, wherein each network address subdivision corresponds to a range within a pool of available network addresses for service provider DNS server computing devices;
    assign, by the service provider, a network address in each of the determined network address subdivisions, wherein the assigned network addresses from each subdivision for the identifiable domain are not matching; and
    transmit, by the service provider, the assigned network address for each determined network address subdivision, wherein DNS server computing devices corresponding to the assigned network addresses will be delegated to be authoritative to respond to DNS queries for the identifiable domain.

13. The system as recited in claim 12, wherein each network address subdivision corresponds to one of four ranges of available network addresses for service provider DNS server computing devices.

14. The system as recited in claim 13, wherein the four ranges of available network addresses are evenly distributed.

15. The system as recited in claim 12, wherein assigning the network address in each of the determined network address subdivisions includes selecting a network address from each determined network address subdivision such that the significant portion of the assigned networks addresses do not match.

16. The system as recited in claim 12, wherein assigning the network address in each of the determined network address subdivisions further includes preventing the assignment of network addresses that results in the matching of a threshold number of significant portions of the assigned network addresses between the identifiable domain and other domains.

17. The system as recited in claim 16, wherein the threshold number of network addresses is defined such that between the identifiable domain and the other domains, there is at least one significant portion of the assigned network addresses that does not match.

18. The system as recited in claim 12, wherein assigning the network address in each of the determined network address subdivision includes performing conflict resolution removing one or more network addresses not available to be assigned due to domain based conflicts.

19. The system as recited in claim 12, wherein assigning the network address in each of the determined network address subdivision includes assigning a uniquely named DNS server that has been previously associated with the identified network address.

20. The system as recited in claim 12, wherein assigning the network address in each of the determined network address subdivisions includes selecting a non-significant portion of each assigned network address such that a threshold number of the non-significant portions of the network addresses for the identifiable domain are not matching.

21. The system as recited in claim 20, wherein the threshold number of non-matching non-significant portions of network addresses includes all the assigned network addresses such that for the identifiable domain, none of the non-significant portions of all the assigned network addresses match.

22. The system as recited in claim 12, wherein the network addresses correspond to Internet protocol network addresses.

23. A non-transitory, computer-readable storage medium having one or more computer-executable components for managing DNS queries, the one or more computer-executable components comprising computer-executable instructions to:
   obtain, by a service provider, a request for hosting DNS query services for an identifiable domain;
   determine, by the service provider, a number of assignable network address subdivisions, wherein each network address subdivision corresponds to a range within a pool of available network addresses for service provider DNS server computing devices;
   assign, by the service provider, a network address in each of the determined network address subdivisions, wherein the assigned network addresses from each subdivision for the identifiable domain are not matching; and
   transmit, by the service provider, the assigned network address for each determined network address subdivision, wherein DNS server computing devices corresponding to the assigned network addresses will be delegated to be authoritative to respond to DNS queries for the identifiable domain.

24. The computer-readable storage medium as recited in claim 23, wherein each network address subdivision corresponds to one of four ranges of available network addresses for service provider DNS server computing devices.

25. The computer-readable storage medium as recited in claim 24, wherein the four ranges of available network addresses are evenly distributed.

26. The computer-readable storage medium as recited in claim 23, wherein assigning the network address in each of the determined network address subdivisions includes selecting a network address from each determined network address subdivision such that the significant portion of the assigned networks addresses do not match.

27. The computer-readable storage medium as recited in claim 23, wherein assigning the network address in each of the determined network address subdivisions further includes preventing the assignment of network addresses that results in the matching of a threshold number of significant portions of the assigned network addresses between the identifiable domain and other domains.

28. The computer-readable storage medium as recited in claim 27, wherein the threshold number of network addresses is defined such that between the identifiable domain and the other domains, there is at least one significant portion of the assigned network addresses that does not match.

29. The computer-readable storage medium as recited in claim 23, wherein assigning the network address in each of the determined network address subdivision includes performing conflict resolution removing one or more network addresses not available to be assigned due to domain based conflicts.

30. The computer-readable storage medium as recited in claim 23, wherein assigning the network address in each of the determined network address subdivision includes assigning a uniquely named DNS server that has been previously associated with the identified network address.

31. The computer-readable storage medium as recited in claim 23, wherein assigning the network address in each of the determined network address subdivisions includes selecting a non-significant portion of each assigned network address such that a threshold number of the non-significant portions of the network addresses for the identifiable domain are not matching.

32. The computer-readable storage medium as recited in claim 31, wherein the threshold number of non-matching non-significant portions of network addresses includes all the assigned network addresses such that for the identifiable domain, none of the non-significant portions of all the assigned network addresses match.

33. The computer-readable storage medium as recited in claim 23, wherein the network addresses correspond to Internet protocol network addresses.

* * * * *